Jan. 27, 1970   M. HASTEN ET AL   3,491,637
CUTTING APPARATUS

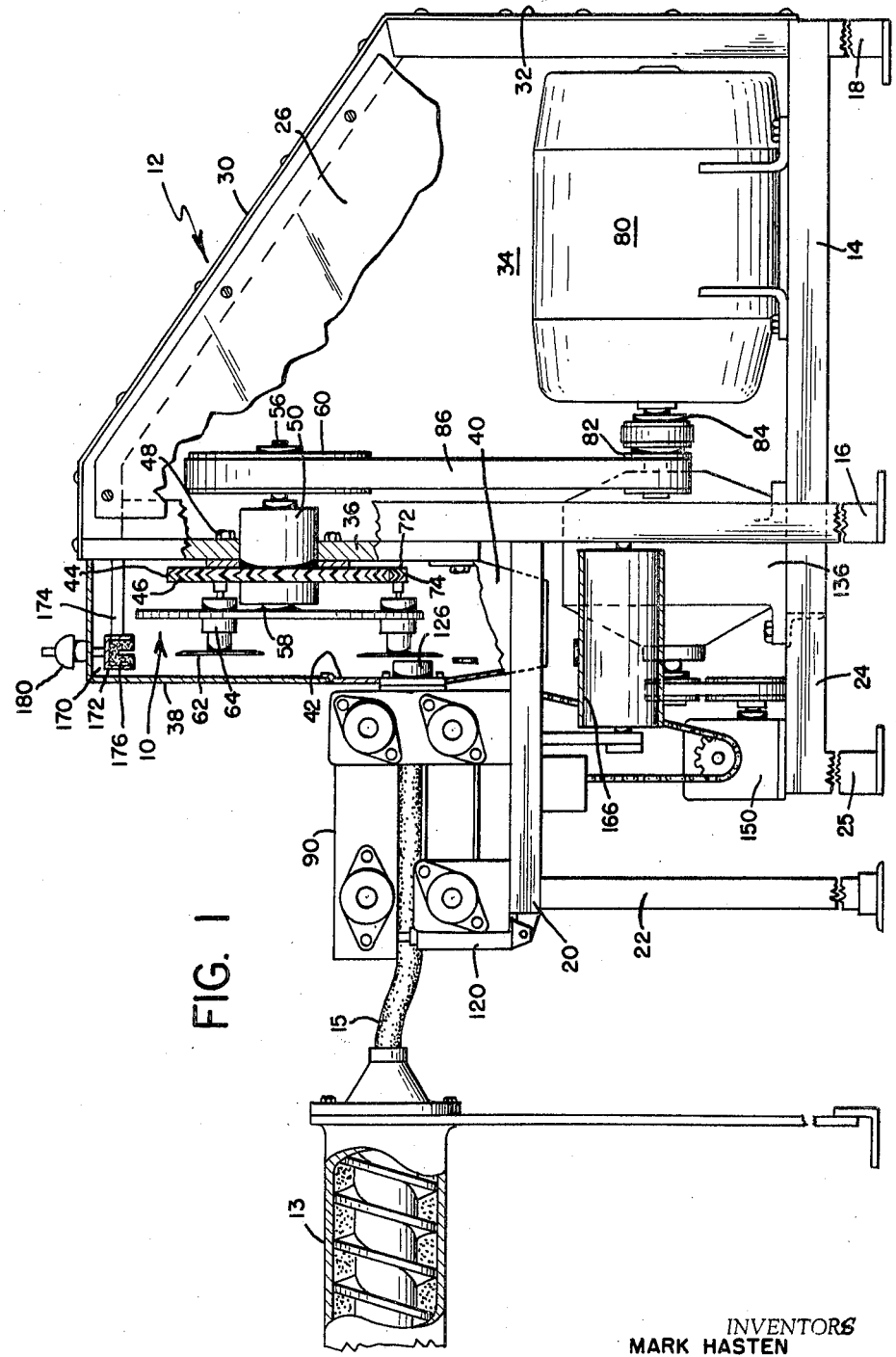

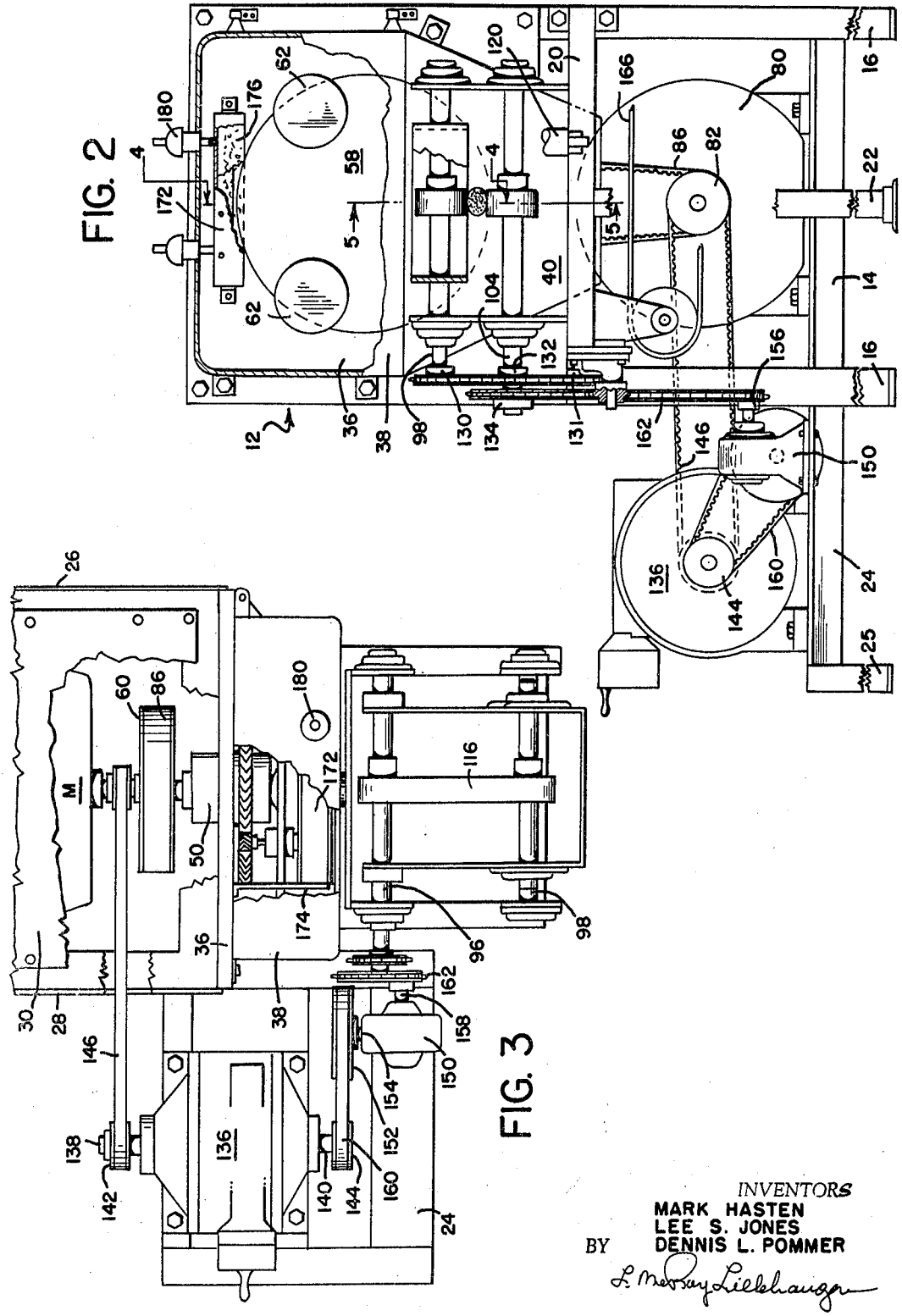

Filed Dec. 23, 1966   4 Sheets-Sheet 3

INVENTORS
MARK HASTEN
LEE S. JONES
DENNIS L. POMMER
BY
ATTORNEY

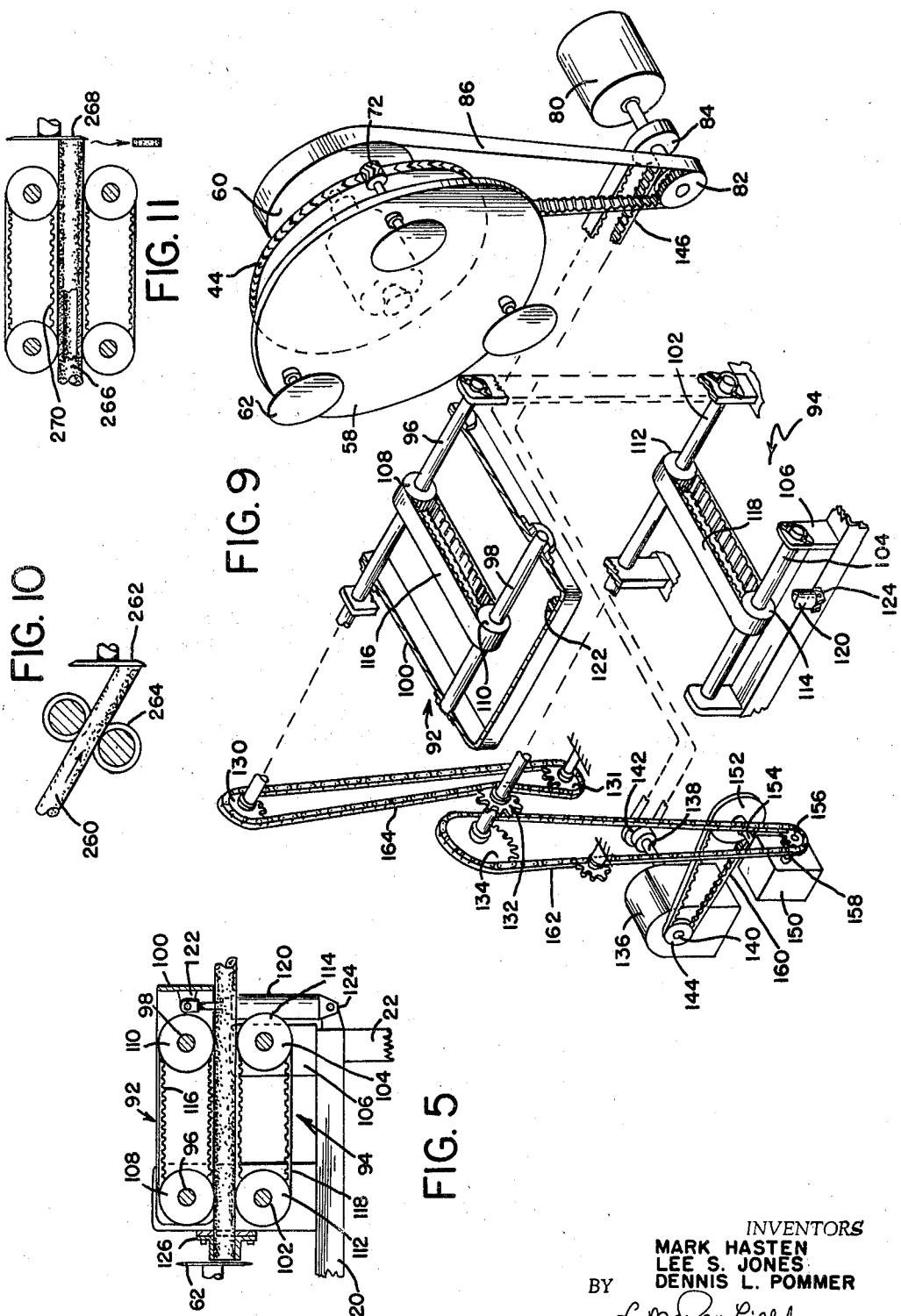

United States Patent Office 3,491,637
Patented Jan. 27, 1970

3,491,637
CUTTING APPARATUS
Mark Hasten, Lee S. Jones, and Dennis L. Pommer, Minneapolis, Minn., assignors to General Mills, Inc., a corporation of Delaware
Filed Dec. 23, 1966, Ser. No. 604,338
Int. Cl. B26d 7/08
U.S. Cl. 83—169                                6 Claims

ABSTRACT OF THE DISCLOSURE

An apparatus for cutting or slicing a rope of material into slices of predetermined thickness without deforming the rope or the slice during the cutting operation. A circular cutting blade, mounted for rotation about two different axes, slices the rope as it is advanced toward the blade at a predetermined feed rate.

---

The present invention relates to a cutting apparatus, and more particularly to an apparatus for cutting or slicing a strand or rope of dough material into segments or slices of controlled thickness.

According to the known prior art, numerous types of devices are known for cutting or slicing a strand or rope of material into segments or slices of predetermined length or width. In food applications for example, a strand or rope of dough material is sometimes formed by discharging the material through a die opening or orifice in an extrusion apparatus. In some cases the rope of material is immediately cut into segments of predetermined length by a knife which passes by the die opening; while in other instances, the extruded product is permitted to cure or dry for a period of time before it is sliced. According to one known practice, the cutting or slicing operation is accomplished by means of a knife blade which is caused to pass by the die opening or orifice. Sometimes the knife blade is caused to reciprocate along a straight line past the orifice, and sometimes the knife blade is mounted for rotation about an axis in such a manner that it defines an arc or circle as it travels past the orifice. The effect of this cutting action is that the material is chopped by the knife blade as the knife and the material come in contact with each other.

Such a cutting operation is satisfactory in many instances. It has however, been found that such a cutting action has certain disadvantages. In many instances, it is desirable that the strand or rope which is being sliced maintain a predetermined cross-sectional shape. Moreover, the rope is often formed of a material which has a relatively soft texture; consequently, it may be difficult to maintain the desired cross-sectional shape during the slicing operation because when the soft rope is subjected to the chopping action of the knife blade, the force due to the friction between the blade and the product is such that it tends to compress the material or product to some extent as it is being cut. The result of this operation is that the sliced product may be deformed to a larger extent than can be tolerated. This is particularly true when the thickness of the rope is relatively large. In other words, as the thickness of the rope increases, the chances of obtaining deformed slices increases. Moreover, it has been found that if very thin slices are desired, they are difficult to obtain with the known prior art devices in substantially underformed shapes. Tubular strands are also quite difficult to slice without deforming the product because the tube tends to collapse quite easily, especially if the material is relatively soft.

Accordingly, one object of the present invention is to provide an improved cutting apparatus.

Another object is to provide a device for cutting or slicing a product having a relatively soft texture without deforming the product during the cutting operation.

A further object is to provide a cutting apparatus for slicing an extruded product in which the cutting operation is performed by a slicing action rather than a chopping action.

A still further object is to provide a cutting apparatus in which a cutting blade is mounted and operated for performing the slicing operation in a more efficient manner.

Another object is to provide a cutting apparatus for slicing an extruded food product whereby the severing is accomplished by a slicing action in which the force due to friction between the blade and the product tends to shear the product along the cutting surface.

Other objects and advantages will become apparent from a consideration of the following specification and accompanying drawings. Before proceeding with a detailed description of the invention however, a brief description of it will be presented.

Briefly, the apparatus includes a plate or disk mounted for rotation about a horizontal axis. One or more circular cutting blades are rotatably mounted on the surface of the plate so that they are rotatable about axes which are parallel to the axis of rotation of the plate. The cutting blades are caused to rotate about their respective axes in response to rotation of the plate about its axis, but at a much faster rate. A rope of material which is to be sliced is fed or advanced along a path which is normal to the surface of the plate, at a rate which is synchronized with the speed of rotation of the plate. As the plate rotates, it carriers the rotating blades along a circular path which intersects with the material, thus severing the material into slices of predetermined width. The thickness of the slice can be controlled by regulating the speed at which the rope of material is advanced toward the cutting blades.

The invention will best be understood by reference to the following drawings wherein:

FIGURE 1 is a side elevational view in partial section of an apparatus embodying the invention;

FIG. 2 is a front elevational view of the apparatus in partial section, taken along line 2—2 of FIGURE 1;

FIG. 3 is a top plan view of the apparatus shown in FIG. 2;

FIG. 5 is a partial sectional view taken alone line 5—5 of FIG. 2;

FIG. 9 is an exploded perspective view illustrating the drive system for operating the invention;

FIG. 10 is a partial schematic view illustrating the material being advanced at an incline toward a cutting blade; and FIG. 11 is a partial sectional view illustrating a tubular strand being advanced toward a cutting blade.

Figure 4:
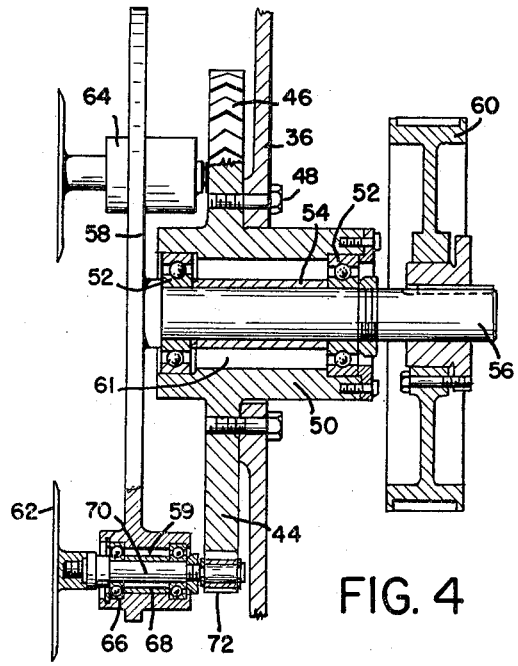
FIG. 4 is a partial sectional view taken along line 4—4 of FIG. 2.

FIGURES 1–3 illustrate the cutting apparatus designated generally by reference numeral 10, mounted for rotation on a support structure or frame 12. The frame 12 includes a first horizontal support platform 14 mounted on legs 16 and 18, a second horizontal support platform 20 mounted on legs 16 and 22, and a third horizontal support platform 24 mounted on legs 16 and 25. Side covers 26 and 28, top cover 30, and back cover 32 form an enclosure or housing 34. A mounting plate 36 is attached to the legs 16, and a cover 38 is hingedly connected to the plate 36. A chute 40 is likewise attached to the plate 36, and it has a front wall 42 against which the cover 38 abuts when the cover is closed. As illustrated in FIGURE 1, an extrusion apparatus 13 is positioned proximate the structure 12 for forming a rope of extruded material of extrudate 15, which is conveyed to the cutting apparatus.

FIG. 4 illustrates the cutting apparatus in greater detail. A stationary gear 44, which is provided with herringbone teeth 46 on its periphery, is secured to the plate member 36 by bolts 48. A housing 50 forms an integral part of the gear 44, and a pair of bearings 52, separated by a spacer 54, are mounted within the housing 50. A shaft 56 is rotatably mounted within the housing 50 by means of the bearings 52. A plate or disc 58 is fixedly secured to one end of the shaft 56, and a positive drive pulley 60, such as a timing pulley, is fixedly secured to the other end of the shaft 56.

A number of circular cutting blades 62 are rotatably mounted on the plate 58 in such a manner that they are rotatable about an axis parallel to the axis of shaft 56. The plate 58 is provided with housings 64 which contain bearings 66 and a sleeve 68. A shaft 70 is rotatably mounted within each housing 64, and the cutting blade 62 is threadedly secured to one end of the shaft. A gear 72, having herringbone teeth 74 on its periphery, is fixedly secured to the other end of the shaft 70 so that it meshes with the teeth 46 on the stationary gear 44. The gears 72 travel about the periphery of the stationary gear 44 as planetary gears when the plate 58 is caused to rotate. The gear ratio of the planetary gears 72 with respect to the stationary gear 44 is such that the gears 72 rotate about their respective axes, substantially faster than the plate 58 rotates about its axis. If desired, the space 59 formed in the housings 64, as well as the space 61 formed in the housing 50, can be filled with a suitable lubricant.

A motor 80 having an output shaft with a pair of timing pulleys 82 and 84 secured thereto, is mounted on the support platform 14 within the housing 34. The pulley 60 is operatively connected to the motor 80 by means of a timing belt 86. By energizing the motor 80, the plate 58 is caused to rotate.

The material 15 to be sliced is advanced toward the cutting apparatus by means of a feed belt assembly 90. As noted in FIG. 5, the assembly 90 includes a pair of belt assemblies 92 and 94. The assembly 92 includes a pair of shafts 96 and 98 mounted for rotation in a frame 100, and the assembly 94 includes a pair of shafts 102 and 104 mounted for rotation in a frame 106. Shafts 96, 98, 102 and 104 have secured thereto pulleys 108, 110, 112 and 114 respectively. A timing belt 116 operatively connects the pulleys 108 and 110 together, and a timing belt 118 operatively connects the pulleys 112 and 114 together. The frame 100 is pivotable about the shaft 96 so that the spacing between the belts 116 and 118 can be varied. An air cylinder 120 is attached adjacent to one end of the frames 100 and 106 at 122 and 124 respectively. By actuating the air cylinder, the frame 100 can be caused to pivot toward or away from the frame 106. A guide or nipple 126 is secured to the oppisite end of the frames. As noted, the guide 126 is aligned with the belts 116 and 118 so that the material 15 is advanced through the guide 126. The belts 116 and 118 are caused to rotate in opposite directions, and they are spaced with respect to each other so that they grip the material 15 and advance it toward the cutting blades 62.

As illustrated in FIGS. 2 and 3, the shaft 96 is somewhat longer than the shaft 98, and it has affixed thereto a sprocket 130. In a like manner, the shaft 102 is longer than the shaft 104, and it has affixed thereto two sprockets 132 and 134.

A variable speed drive unit 136 is mounted on the platform 24 and it is provided with an input shaft 138 and an output shaft 140. Pulleys 142 and 144 are attached to the shafts 138 and 140 respectively. The pulley 142 is operatively connected to the pulley 84 mounted on the motor output shaft, by means of a timing belt 146. Variable speed drive units of this type are well known in the art and will not be described or illustrated in detail. As known, the output speed can be varied with respect to the input speed.

A speed reducer 150 is also mounted on the platform 24. Speed reducers are also well known in the art and will not be described in detail. Generally, their purpose is to achieve a reduced output speed with respect to the input speed. A pulley 152 is attached to an input shaft 154, and a pulley or sprocket 156 is attached to an output shaft 158. The speed reducer 150 is operatively connected to the variable speed drive unit 136 by means of a timing belt 160, and to the feed belt assembly 90 by means of a chain 162. The chain 162 engages the sprockets 156 and 134; and a chain 164 engages sprockets 130, 131 and 132.

A conveyor 166, attached to the support structure 12 by appropriate means, is provided for conveying the slices or segments away from the apparatus for additional processing or storage.

A lubricating device 170 is provided for cleaning the blades 162 and applying a lubricant to them as they rotate about the axis of shaft 56. The device 170 includes a frame 172 which is secured to the plate 36 by brackets 174, and a pad or wick 176 formed of an absorbent material which is positioned within the frame 172. As noted, the pad is provided with a slit 178 on its under surface which permits the blades 62 to pass therein. A lubricating medium is applied to the pad by one or more dispensers 180. In some instances, the material 15 might be somewhat sticky or tacky, the pad 176 cleans the blade and coats it so that the material is less likely to stick to the blade as it slides throughout the material.

In operation, the motor 80 is used for imparting relative movement to both the cutting mechanism 10 and the feed belt assembly 90. By energizing the motor, the shaft 56 is caused to rotate about its axis; as the shaft 56 rotates, it causes the plate 58 to rotate as well. The blades 62 are also caused to rotate in the same direction by means of the shafts 70 and the gears 72 which are engaged by the teeth on the stationary gear 44. While the stationary gear 44 and the planetary gears 72 are shown as having herringbone teeth on their respective peripheries, other types of gear teeth might be used as well. Herringbone teeth enable the device to operate more quietly, they add more strength to the gear teeth, and they aid in minimizing backlash. Thus, rotation of the plate 58 causes the blades 62 to rotate in a circular path about the axis of their respective shafts, as well as in a circular path about the axis of shaft 56.

The velocity at which the blades 62 rotate about the shaft 56 is related to the r.p.m. of the drive shaft 56 as well as the radial distance between the shaft 56 and the shafts 70. The velocity of the blades 62 about the axis of their own shafts is related to the r.p.m. of the drive shaft 56 and the ratio of the stationary gear 44 to the planetary gears 72. Rotation of the plate 58 feeds the blades through the product or rope 15, while rotation of the blades with respect to the plate causes the rope to be sliced by a shearing action. The blades 62 are caused to rotate at a velocity which is substantially greater than the speed of rotation of the plate 58. Generally, the blades should rotate from about 5 to 15 times faster than the plate rotates.

The rope of material or extrudate 15, such as a food product, is discharged from the extruder 13 and guided and advanced along a path which is normal to the surface of the plate 58, as well as the surface of the blades 62, by means of the feed belt assembly 90. As noted in FIG. 2, the extrudate 15 has an oval-shaped cross section. Thus, the opening in the guide should be oval shaped as well.

It should be realized of course that the extrudate might have some other cross-sectional shape as well. The belts 116 and 118 are driven at the same speed, but in opposite directions, through the variable speed drive unit 136, which in turn is driven by the motor 80, at a speed which is a constant ratio of the speed of shaft 56. As the belts 116 and 118 move, they gently grip the rope and advance it through the guide 126 at which point it is sliced by the cutting blades. The pressure exerted by the belts 116 and 118 on the material 15 is controlled by actuating the air cylinder 120 which causes the upper belt assembly 92 to pivot with respect to the belt assembly 94. Relative motion is imparted to the belts 116 and 118 by means of the belt 146, the variable speed drive unit 136, the belt 160, the speed reducer 150, and the chains 162 and 164.

The blade r.p.m. and the product feed are synchronized to cut through the product at constant intervals of lengths regardless of any variants in the drive shaft speed. The thickness of the cut slice can be changed or varied by changing the speed of the feed belts 116 and 118 with respect to the blades. This is readily accomplished by means of the variable speed drive unit 136. Thus, by increasing the speed of the belts, the length or thickness of the cut product can be increased, and vice versa. Moreover, if desired, more than one feed belt assembly might be provided, so that each blade cuts through more than one rope per revolution about the axis of shaft 56.

The relative speed at which the various components move depends not only on the output speed of the motor 80, but also on the ratios between the various gears, timing pulleys, timing belts and chains. For example in one instance, the motor 80 was rotated at about 1150 r.p.m. By using appropriate ratios between the pulleys 82 and 60, the plate 58 was caused to rotate at about 380 r.p.m. By selecting a proper ratio between the gears 44 and 72, the blades 62 were caused to rotate at about 3,000 r.p.m. The feed belt assembly 90 on the other hand, was caused to advance the rope 15 at a rate of about two feet per minute by selecting a proper ratio between the components interposed between the sprockets 132 and 134 and the pulley 84, as well as by controlling the output speed of the variable speed drive unit.

An extrudate or rope of dough material 15 was formed of a dough material, and it had an oval cross-sectional shape of about one and one-half inches by two and one-half inches, and it had a relatively soft, spongy, texture. The cutting apparatus was used for obtaining slices having a thickness of about 30 thousandths of an inch without deforming the slices to any objectionable extent.

Figure 6:
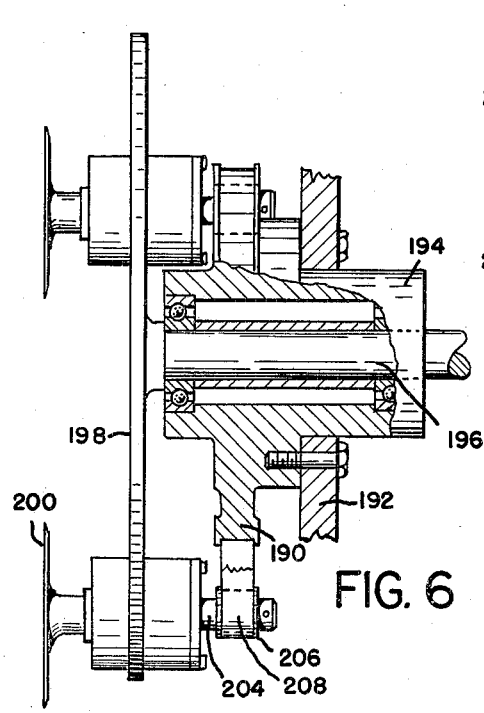
FIG. 6 is a view similar to FIG. 4, but showing another embodiment of the invention.

FIG. 6 illustrates another embodiment of the cutting mechanism. This embodiment is substantially the same as that shown in FIG. 4 in that it shows a stationary pulley 190 attached to a mounting plate 192. The pulley 190 includes a housing 194, and a shaft 196 is rotatably mounted within the housing. A plate member 198, having one or more cutting blades 200 rotatably mounted therein, is connected to one end of the shaft 196, and a timing pulley (not shown) is connected to the other end of the shaft. The cutting blades 200 are attached to one end of shafts 204, and pulleys 206 are affixed to the other end. A timing belt 208 operatively connects the pulleys 190 and 206 together, and causes the blades 200 to rotate as the plate member 198 rotates, in much the same manner described above in conjunction with FIG. 4.

Figure 7:
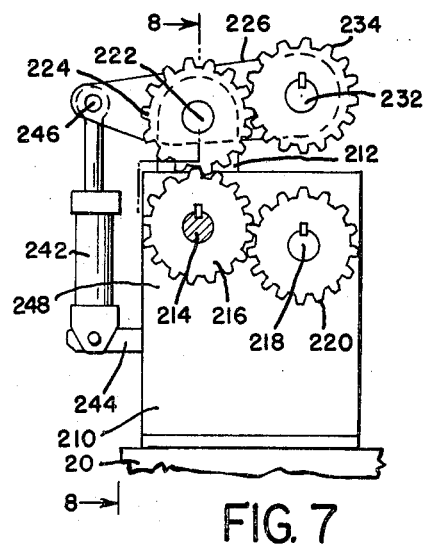
FIG. 7 is a view similar to FIG. 5 but showing another embodiment of the invention.
Figure 8:
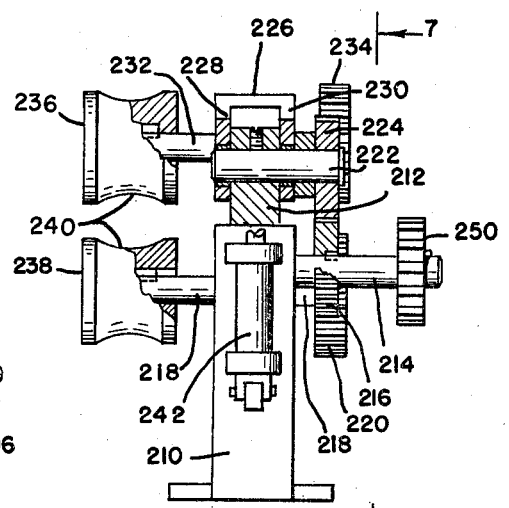
FIG. 8 is a sectional view taken along line 8—8 of FIG. 7.

FIGS. 7 and 8 illustrate another embodiment for advancing a rope of material toward the cutting blades. A housing 210, which includes an upper portion 212, is mounted on the platform 20. A drive shaft 214 having a sprocket 216 fixedly secured thereto, and a driven shaft 218 having a sprocket 220 fixedly secured thereto are rotatably mounted in the housing 210. A second driven shaft 222, having a sprocket 224 journaled thereon, is fixedly mounted in the upper portion 212. A U-shaped arm 226 is pivotally mounted on the shaft 222 so that members 228 and 230 straddle the portion 212. A third driven shaft 232, having a sprocket 234 fixedly secured thereto, is rotatably mounted in the arm 226. Rollers 236 and 238 having concave surfaces 240, are fixedly secured to shafts 232 and 218 respectively. An air cylinder 242 is attached to the housing 210 by means of an arm 244, and to the arm 226 by means of a pin 246. By actuating the cylinder 242, the arm can be pivoted about the axis of shaft 222, thereby varying the space between the rollers 236 and 238. As illustrated, the sprocket 220 is engaged by the sprocket 216; in a like manner, the sprocket 224 is engaged by the sprocket 216; and the sprocket 234 is engaged by the sprocket 224. A sprocket 250 is fixedly secured to the drive shaft 214, and it is driven by means of the motor 80 through the variable speed drive unit and speed reducer.

The operation of this embodiment is substantially the same as the embodiment shown in FIG. 5. By rotating the drive shaft 214 and sprocket 216 in a counter-clockwise direction, the rollers 236 and 238 can be caused to rotate in opposite directions with respect to each other. A rope of material is fed between the rollers 236 and 238, and they grip the material and advance it toward the cutting mechanism where it is sliced into lengths of desired thickness.

If desired, an oval-shaped slice might be formed from a rope having a circular cross-sectional shape by feeding the rope toward the cutting blades at an incline or at an angle. FIG. 10 illustrates a rope of material 260 being advanced at an incline, toward a cutting blade 262, by means of a pair of rollers 264. By advancing the rope in such a manner, oval-shaped slices can be formed from a rope having a circular cross-sectional shape.

FIG. 11 shows a tubular strand of material 266 being advanced toward a cutting blade 268 by means of a pair of belt assemblies 270. The strand 266 has an outer circular cross-sectional shape, and the slices are doughnut-shaped.

In the above description and attached drawings, a disclosure of the principles of this invention is presented, together with some of the embodiments by which the invention may be carried out.

Now therefore, we claim:

1. In combination, an apparatus for cutting an elongate rope of material into segments or predetermined length comprising a support means, a plate member having a front surface, means for rotatably mounting said plate on the support so that it is rotatable about a horizontal axis, means for rotating said plate about said axis, a plurality of circular cutting blades, each blade having a continuous cutting edge, means for rotatably mounting said blades on the front surface of the plate so that each blade moves with respect to said plate about a single axis which is parallel to said horizontal axis, each blade being positioned on said plate so that it defines a circular path as the plate is caused to rotate, means for rotating each blade about its respective axis in response to rotation of the plate member about its axis, the speed of rotation of each blade being substantially greater than the speed of rotation of the plate, and means independent of the cutting apparatus for continuously advancing the rope of material along a path normal to and toward the front surface of the plate whereby the cutting blades intersect with and slice through the rope as the plate rotates and the blades come in contact with said rope, said rope being advanced at a speed which is synchronized with the speed of rotation of the plate member.

2. The combination of claim 1 wherein gearing means is provided for causing the cutting blade to rotate about its axis as the plate member is caused to rotate about its axis, said gearing means including a stationary gear means and a movable planetary gear operatively connected to the cutting blade, said planetary gear being adapted to mesh with the stationary gear as the plate member is caused to rotate, thereby causing the cutting blade to rotate about its axis, said stationary gear and said planetary gear being provided with herringbone teeth on their respective peripheries.

3. The combination of claim 1 wherein belt drive means is provided for causing the cutting blade to rotate about its axis as the plate member is caused to rotate about its axis, and the cutting blade rotates about its axis five to fifteen times faster than the plate member rotates about its axis.

4. The combination of claim 1 wherein at least two spaced apart counter-rotating pulleys are provided for gripping the rope of material and advancing it toward the front surface of the plate member and the cutting blade, one of said pulleys being connected to a shaft rotatably mounted in a housing, an arm member pivotally connected to said housing, means for pivoting said arm member about an axis proximate one of its ends, the other pulley being connected to a shaft rotatably mounted in said arm member proximate its other end, and means are provided for adjusting the spacing between said pulleys by pivoting said arm member with respect to the housing.

5. The combination of claim 1 wherein a pair of spaced apart belt assemblies are provided for gripping the material and advancing it toward the front surface of the plate member and the cutting blade, each belt assembly including a frame member and a pair of spaced apart pulleys rotatably mounted on each frame member, the pulleys in each frame member being operatively connected to each other, the pulleys in one frame member being caused to counterrotate with respect to the pulleys in the other frame member, one of said frame members being pivotable with respect to the other frame member about an axis coinciding with the axis of rotation of one of the pulleys, and means are provided for adjusting the relative spacing between said belts by pivoting said one frame member with respect to the other frame member.

6. In combination, a slicing apparatus comprising a plate member having a front surface, mounted for rotation about an axis, means for rotating said plate about said axis, at least one circular cutting blade, means for rotatably mounting said cutting blade on the front surface of said plate member, said blade being rotatable about an axis parallel to the axis of rotation of the plate member, means for rotating said blade about its axis in response to relative rotation of the plate member about its axis, means independent of said slicing apparatus for continuously advancing a rope of material to be sliced, along a path toward the front surface of the plate whereby the cutting blade intersects with said rope thereby severing it as the blade rotates about the axis of the plate member, means for applying a lubricating medium to the cutting blade as the plate rotates about its axis, said lubricating means including a pad of absorbent material which is saturated with the lubricating medium, and means for positioning said pad at a point whereby the cutting blade contacts the pad and is coated with the lubricant periodically as the blade rotates about the axis of rotation of the plate member, at least a portion of the cutting blade being coated with the lubricant as it contacts and passes by said pad.

References Cited

UNITED STATES PATENTS

| 2,207,383 | 7/1940 | Rodenacker | 83—490 X |
| 2,391,719 | 12/1945 | Llewellyn | 83—355 |
| 2,692,645 | 10/1954 | Driesch | 83—490 X |
| 2,821,253 | 1/1958 | Heffelinger et al. | 83—355 X |
| 2,895,553 | 7/1959 | De Gelleke | 83—169 X |
| 3,104,579 | 9/1963 | Blankenship et al. | 83—355 |
| 3,245,300 | 4/1966 | Hasten et al. | 83—355 |
| 3,353,430 | 11/1967 | Brackmann et al. | 83—490 X |
| 1,893,057 | 1/1933 | Hohn | 146—101 |
| 1,992,722 | 2/1935 | Smith | 146—101 |
| 2,093,323 | 9/1937 | Lamoreaux | 146—101 |
| 2,464,108 | 3/1949 | Weisner et al. | 146—101 |
| 3,306,147 | 2/1967 | Goodman | 83—422 X |

JAMES M. MEISTER, Primary Examiner

U.S. Cl. X.R.

83—355, 422, 490